United States Patent [19]

Gitzendanner

[11] Patent Number: 4,620,251
[45] Date of Patent: Oct. 28, 1986

[54] MAGNETIC TRANSDUCER SUPPORT STRUCTURE

[75] Inventor: Louis G. Gitzendanner, Oklahoma City, Okla.

[73] Assignee: Magnetic Peripherals Inc., Minneapolis, Minn.

[21] Appl. No.: 494,224

[22] Filed: May 13, 1983

[51] Int. Cl.$^4$ .......................... G11B 5/60; G11B 15/64
[52] U.S. Cl. ...................................... 360/103; 360/105
[58] Field of Search ............... 360/105, 104, 109, 106, 360/102–103, 97–99, 75–78

[56] References Cited

U.S. PATENT DOCUMENTS

| | | | |
|---|---|---|---|
| 3,518,658 | 6/1970 | Black et al. | 340/347 |
| 3,864,747 | 2/1975 | Pejcha | 360/98 |
| 3,984,873 | 10/1976 | Pejcha | 360/105 |
| 4,167,765 | 9/1979 | Watrous | 360/103 |
| 4,388,655 | 6/1983 | Zenzefilis | 360/97 X |
| 4,391,035 | 7/1983 | Van de Bult | 360/103 |

OTHER PUBLICATIONS

IBM Technical Disclosure Bulletin, vol. 29, No. 11, Apr. 1981.

*Primary Examiner*—John H. Wolff
*Attorney, Agent, or Firm*—Joseph A. Genovese; Edward L. Schwarz

[57] ABSTRACT

An apparatus for positioning a magnetic transducer member with respect to a magnetic disk has an actuator which is rotated about an axis and includes an arm having a first end secured to the actuator for rotation of the arm about the axis. The arm has an oppositely disposed second end. A load spring member has a first end and a second end and is secured at its first end to the second end of the arm. A gimbal spring is secured to the second end of the load spring member and supports the transducer member. The gimbal spring permits the transducer member to move vertically and to pitch and roll as it flies over the rotating surface of the magnetic disk. The arm, load spring member, and gimbal spring are symmetrical with respect to a straight line running from the axis of rotation of the actuator to the center of the transducer. The transducer member is a two ski head and has a magnetic read/write core secured to the trailing edge of one of the skis. The center line of the core gap is substantially parallel to the trailing edge of the ski.

6 Claims, 7 Drawing Figures

MAGNETIC TRANSDUCER SUPPORT STRUCTURE

BACKGROUND

The present invention relates to structures for supporting and positioning a magnetic transducer with respect to a magnetic disk.

In the past, the pivoting arms of such structures have typically assumed a dog-legged shape. It is believed that the dog-leg shape was adopted due to the preexistence of linear positioner structures which moved radially rather than pivotally (i.e., voice coil linear positioners). The dog-leg shape allowed the use of the very same spring structure as was used for the linear positioners, and hence, it is suspected that the dog-leg shape was adopted for that reason.

A problem with a dog-leg shaped arm, however, is that the arm is unduly massive and asymetric with respect to the rotational axis of the actuator. Consequently, system response and performance have suffered.

The prior art does disclose pivoting arm structures which run in a substantially straight line from the actuator axis to the center of the transducer. See, for example, U.S. Pat. No. 3,864,747. The structures disclosed, however, are both massive and slow, and permit only very limited movement of the flying head in response to the aerodynamic forces generated by the rotating disk.

SUMMARY

The present invention overcomes the problems of the prior transducer supporting structures by providing an arm and spring assembly which are symetrical about the actuator axis, while loading the transducer against the disk and permitting the gimbaling of the transducer as it flies over the disk. The arm and spring assembly are symetrical about a straight line running from the axis of the actuator to the center of the transducer member. The spring assembly is comprised of a load spring and a gimbal spring. The dog-leg shape of the conventional prior structure is eliminated while the transducer supporting spring assembly is improved. The present invention greatly reduces the inertia of the arm and increases system response and performance while reducing the power requirements of the actuator.

It is, therefore, an object of the present invention to provide an improved pivoting transducer support arm.

It is another object of the present invention to reduce the mass and inertia of the pivoting transducer support arm to increase system response and performance.

Still another object is to provide a transducer supporting spring assembly and arm which are symmetric about a line running from the actuator axis of rotation to the center of the transducer and permit the gimbaling of the transducer as it flies over the disk.

These and other objects, advantages and novel features of the invention will become apparent from the following detailed description of the invention taken in conjunction with the accompanying drawings.

DESCRIPTION OF THE PRESENTLY PREFERRED EMBODIMENT

Figure 1:
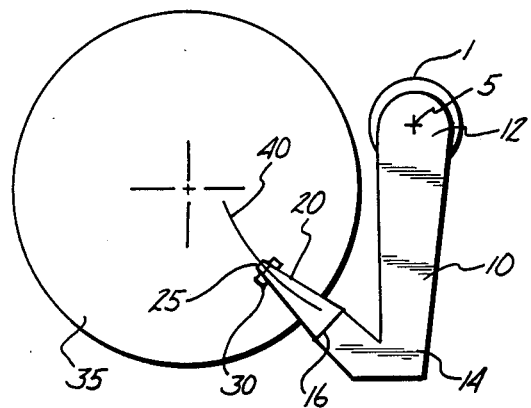
FIG. 1 is a plan view of the transducer supporting structure of the prior art.

FIG. 1 shows the conventional pivoting positioner structure of the prior art. A rotary actuator 1 has an axis of rotation 5. The actuator 1 is selectively rotated under the control of a servo system in a known manner. A head supporting arm 10 has a first end 12 which is rigidly secured to the actuator 1 for rotation about axis 5. Arm 10 has a second end 16 and a dog-leg portion 14 intermediate first end 12 and second end 16. A load spring 20 is rigidly secured to second end 16 and a gimbal spring 25 is secured to spring 20. Gimbal spring 25 supports the transducer member 30 opposite to magnetic disk 35. As disk 35 rotates, transducer 30 flies over and reads and/or writes on the recording surface of the disk 35. Spring member 25 allows transducer 30 to move vertically and to pitch and roll as it flies over the recording surface of disk 35. Transducer 30 is moved along an arc 40 by actuator 1, arm 10 and springs 20, 25.

Figure 2:
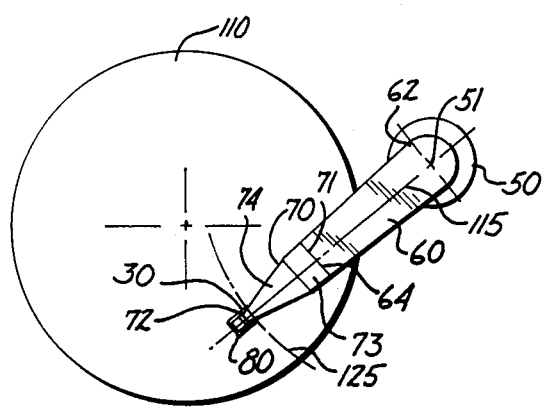
FIG. 2 is a plan view of the transducer supporting structure of the present invention.

FIGS. 2-7 show the improvement comprising the present invention. Whereas in the past, the arm supporting the transducer in a magnetic recording system generally assumed the dog-leg shape of arm 10 of FIG. 1, with spring members 20, 25 being oriented substantially radially with respect to disk 35; as shown in FIG. 2, the transducer supporting arm 60 of the present invention has been straightened to eliminate the dog-leg portion and spring assembly 70, 80, supporting transducer member 90, is now oriented substantially at right angles to the disk radius. Spring assembly 70, 80 permits transducer 90 to move vertically and to pitch and roll in response to the aerodynamic forces generated by the disk 110.

With reference to FIG. 2, an actuator 50 has an axis of rotation 51. Arm 60 has a first end 62 rigidly secured to actuator 50 for rotation of the arm 60 about axis 51. Arm 60 has a second end 64 directly opposite first end 62, as shown. A load spring 70 has a first end 71 and second end 72. First end 71 is secured to the second end 64 of arm 60. Gimbal spring 80 is secured to the second end 72 of load spring 70 and supports transducer member 90.

Figure 3:
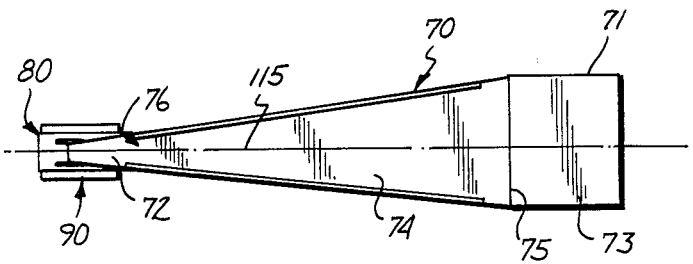
FIG. 3 is a top plan view of the spring assembly and transducer member of the present invention.
Figure 4:
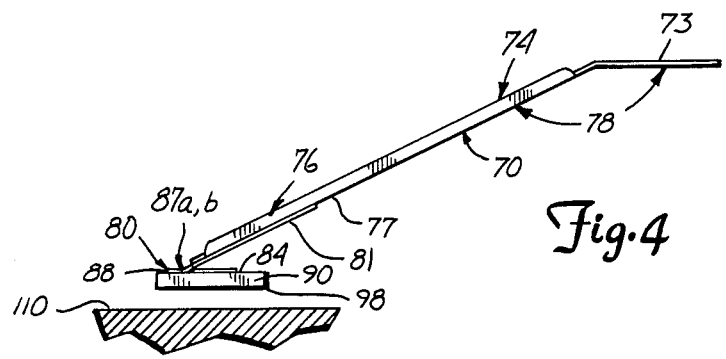
FIG. 4 is an elevational view of the spring assembly and transducer member of the present invention showing a portion of disk 110 in cross section. Angle 78 approaches 180° but is reduced in FIG. 4 for clarity in showing the gimbal spring member 80.
Figure 5:
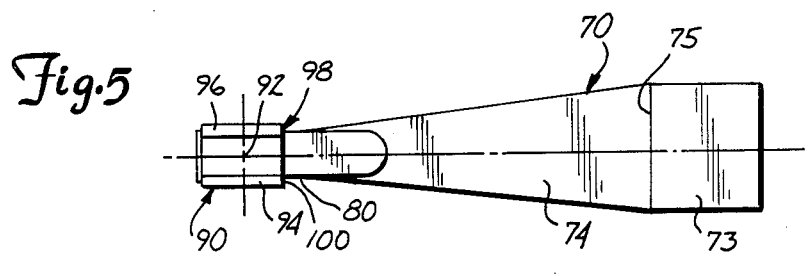
FIG. 5 is a bottom plan view of the spring assembly and transducer member of the present invention.
Figure 6:
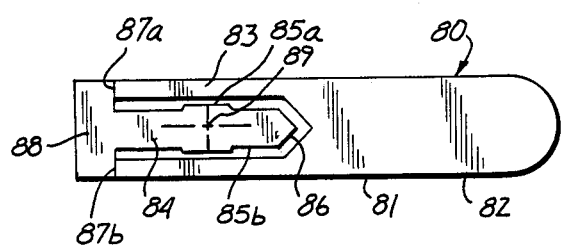
FIG. 6 is an enlarged plan view of the gimbal spring of the present invention.

FIGS. 3-6 show the spring assembly 70, 80 and transducer member 90 in more detail. Load spring 70 is comprised of a base portion 73 and a deflected portion 74 disposed at an angle 78 with respect to base portion 73. Base portion 73 is secured to arm 60. Deflected portion 74 has a first end 75 and a second end 76 opposite thereto. First end 75 comprises an elastic hinge. Gimbal spring 80 is secured to the underside 77 of second end 76 as shown in FIGS. 4 and 5. The structure of gimbal spring 80 is best illustrated by FIG. 6. Gimbal spring 80 is comprised of a resilient, elongated member 81 having a rearward portion 82 and a forward portion 83. A tab 84, having sides 85a, 85b, and an end 86, is cut from the central region of forward portion 83 as shown. Elastic hinges 87a, 87b are formed when tab 84 is cut from member 81. Hinges 87a, 87b allow the tab 84 and forward end portion 88 to pivot away from the elongated member 81 as is best shown in FIG. 4. Tab 84 includes a center 89. Likwise, transducer member 90 includes a center 92. See FIG. 5. The center 92 of transducer member 90 is secured to the center 89 of tab 84 and the transducer member 90 is thereby supported horizontally over a magnetic disk 110 as showin in FIG. 4. Load spring 70 biases, or loads, transducer member 90 towards the disk 110, while gimbal spring 80 permits transducer member 90 to pitch and roll as transducer 90 flies over the disk 110. In the loaded position where transducer 90 is flying over disk 110 angle 78 of FIG. 4 approaches 180° whereas in the unloaded position where load spring 70 is removed from arm 60 the angle 78 is around 155°.

Figure 7:
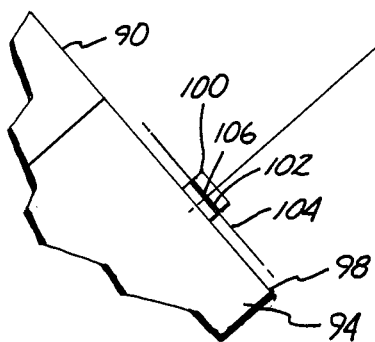
FIG. 7 is a diagrammatic view showing the substantially perpendicular relationship between the center line of the core gap and a straight line running from the actuator axis to the center of the gap.

Transducer member 90 is a two ski head in the present embodiment, having a first ski 94, a second ski 96, and a trailing edge 98. As shown in FIG. 7, which will be explained more fully later on, a magnetic read/write core 100 is secured to the trailing edge 98 of ski 94. Note, that core 100 has been enlarged in FIG. 7 for the purpose of description. Core 100 includes a gap 102 which runs substantially parallel to trailing edge 98. Gap 102 has a center line 104, which also runs substantially parallel to trailing edge 98, and has a center 106.

With reference to FIGS. 2, 3 and 5, note that the arm 60, and spring assembly 70, 80 are symmetric about a line 115 running from the actuator axis 51 to the center 92 of transducer member 90. This symmetric feature of the present invention minimizes resonant frequency problems of the servo system. Obviously, such symmetry was not possible with the prior conventional dog-leg design.

FIG. 7 illustrates another important feature of the invention. In the present invention the center line 104 of gap 102 is substantially perpendicular to the line 120 running from actuator axis 51 to the center 106 of gap 102. This substantially perpendicular relationship between center line 104 and line 120 is especially advantageous where position servo information is to be written on and read from the disk as is the case with the present invention.

Note further that actuator 50, arm 60 and spring assembly 70, 80 move transducer 90 along an arc 125 which, if desired, can be identical to the arc 40 of FIG. 1. Accordingly, only minimal changes need to be made to the prior servo systems to utilize the improved design of the present invention.

Having disclosed the presently preferred embodiment of the invention, many modifications and variations thereof will be obvious to those skilled in the art, and accordingly, the invention is intended to be limited only by the scope of the appended claims.

I claim:

1. In a magnetic recording system including an apparatus for supporting and selectively positioning a transducer having a surface for flying and a center therein, with respect to a rotatable magnetic disk medium, the improvement comprising:
    an actuator selectively rotatable about an axis;
    a substantially straight arm rigidly secured to said actuator at a first end of said arm whereby said arm rotates about said axis with said actuator;
    a load spring having a first end secured to a second end of said arm; and
    a gimbal spring secured to a second end of said load spring, said gimbal spring supporting the transducer with its flying surface adjacent to the recording surface of the magnetic disk medium for reading and/or writing information at locations on said recording surface selected in accordance with rotational movement of said medium and rotation of said actuator;
    said arm, transducer flying surface, load spring and gimbal spring being symmetrical about a first line from said axis to the center of said transducer flying surface;
    said arm and load spring with said line all extending substantially in the direction of said relative medium movement adjacent the transducer flying surface.

2. The apparatus of claim 1 including a magnetic core secured to said transducer and having a gap with a center line substantially perpendicular to said first line.

3. The apparatus of claim 2 wherein said load spring biases said gimbal spring and said transducer towards said recording surface of said disk.

4. The apparatus of claim 1 wherein said load spring includes a deflected portion and a base portion, said base portion being secured to said second end of said arm and being joined to said deflected portion by an elastic hinge, said deflected portion having a first end and a second end; and wherein said gimbal spring comprises an elongated member having a forward portion and a rearward portion, said rearward portion being secured to said second end deflected portion, said forward portion including a tab cut out of said forward portion along opposing sides and an end of said tab, said tab being elastically hinged to said elongated member, said transducer member being secured to said tab.

5. The apparatus of claim 1 wherein said transducer has a first ski, and a second ski, and a trailing edge, and wherein a magnetic core is secured to said first ski along the trailing edge thereof such that said center line of a gap of said runs substantially parallel to said trailing edge of said transducer.

6. The apparatus of claim 1 wherein said first line extends substantially perpendicular to the radius of said disk passing through the point of transducer proximity to the recording surface.

* * * * *